US007212249B1

(12) United States Patent
Casement et al.

(10) Patent No.: US 7,212,249 B1
(45) Date of Patent: May 1, 2007

(54) TELEVISION SCHEDULE SYSTEM WITH POP-UP ACTION MENU AND ICONS (75) Inventors: Marcia A Casement, Danville, CA (US); David Folker, Fremont, CA (US)

(73) Assignee: Starsight Telecast, Inc., Fremont, CA (US)

( * ) Notice: Subject to any disclaimer, the term of this patent is extended or adjusted under 35 U.S.C. 154(b) by 413 days.

(21) Appl. No.: 10/831,594

(22) Filed: Apr. 23, 2004

Related U.S. Application Data (63) Continuation of application No. 08/715,192, filed on Sep. 17, 1996, now abandoned.

(51) Int. Cl.
H04N 5/445 (2006.01)
H04N 5/50 (2006.01)

(52) U.S. Cl. .................. 348/564; 348/563; 348/569; 725/39; 725/40; 725/43; 725/52; 715/808; 715/716; 715/719

(58) Field of Classification Search ................ 715/716, 715/717, 718, 719, 808, 810; 345/902; 348/564, 348/563, 565, 569, 552, 460, 461, 734; 725/39, 725/38, 40, 43, 55, 58, 52
See application file for complete search history.

(56) References Cited

U.S. PATENT DOCUMENTS

| 4,706,121 | A | 11/1987 | Young |
| 5,247,611 | A | 9/1993 | Norden-Paul et al. |
| 5,353,121 | A | 10/1994 | Young et al. |
| 5,532,753 | A | 7/1996 | Buchner et al. |
| 5,550,578 | A | 8/1996 | Hoarty et al. |
| 5,583,560 | A | 12/1996 | Florin et al. |
| 5,585,838 | A | 12/1996 | Lawler et al. |
| 5,585,866 | A | 12/1996 | Miller et al. |
| 5,592,551 | A | 1/1997 | Lett et al. |
| 5,621,456 | A | 4/1997 | Florin et al. |

(Continued)

FOREIGN PATENT DOCUMENTS

EP   0 682 452 A   11/1995

(Continued)

OTHER PUBLICATIONS

Brochure by StarSight Telecast, Inc., entitled "In The Beginning, Television Viewers Had Two Choices, On or Off"; 8 pages; 1994.

(Continued)

Primary Examiner—David Ometz
Assistant Examiner—Jean W. Désir
(74) Attorney, Agent, or Firm—Fish & Neave IP Group of Ropes & Gray LLP; Paul Leblond (57) ABSTRACT The present invention includes an interactive computer system which provides television schedule information and displays an action pop-up listing actions which can be scheduled. In the preferred embodiment, a memory stores a computer program, image data, and received data. This data includes the television schedule information. A processor uses the computer program to organize the television schedule information into a desired format, display an action pop-up for a chosen program, and schedule an action listed in the pop-up when selected by the user. Icons are listed in various displays indicating actions scheduled for associated programs.

28 Claims, 8 Drawing Sheets

U.S. PATENT DOCUMENTS

| | | |
|---|---|---|
| 5,635,978 A | 6/1997 | Alten et al. |
| 5,686,954 A | 11/1997 | Yoshinobu et al. |
| 5,727,060 A * | 3/1998 | Young ................. 348/734 |
| 5,822,123 A | 10/1998 | Davis et al. |
| 5,828,419 A * | 10/1998 | Bruette et al. ........... 725/28 |
| 5,893,073 A | 4/1999 | Kasso et al. |
| 5,945,988 A | 8/1999 | Williams et al. |
| 5,969,748 A | 10/1999 | Casement et al. |
| 5,982,445 A | 11/1999 | Eyer et al. |
| 6,002,394 A * | 12/1999 | Schein et al. ............ 725/39 |
| 6,144,401 A | 11/2000 | Casement et al. |
| 6,388,714 B1 * | 5/2002 | Schein et al. ........... 348/563 |
| 6,418,556 B1 * | 7/2002 | Bennington et al. ........ 725/40 |
| 6,732,369 B1 * | 5/2004 | Schein et al. ............ 725/39 |
| 7,047,547 B2 * | 5/2006 | Alten et al. ............. 725/28 |

FOREIGN PATENT DOCUMENTS

WO     WO 96/21990 A     7/1996

OTHER PUBLICATIONS

Brochure by StarSight Telecast, Inc., entitled "StarSight Will Tell You Everything You Ever Wanted To Know About Your Favorite TV Shows. Except How They End."; 4 pages; 1995.

* cited by examiner

TELEVISION SCHEDULE SYSTEM WITH POP-UP ACTION MENU AND ICONS

CROSS REFERENCE TO A RELATED APPLICATION

This application is a continuation of U.S. patent application Ser. No. 08/715,192, filed Sep. 17, 1996 now abandoned, which is hereby incorporated by reference herein in its entirety.

BACKGROUND OF THE INVENTION

Systems are available for providing television schedule information to a user. For example, U.S. Pat. No. 4,706,121 B1 (Young), provides a television schedule system and process. The system disclosed in the Young patent receives television schedule information as a broadcast. In one embodiment of Young, the television schedule information is provided on the user's television screen. The user can then supply selection criteria which are utilized by the Young system to make program selection, to control the television schedule information displayed on the television screen, etc. In addition, Young discloses a system which controls a television receiver to allow for the automatic user selection of programs and the automatic, unattended recording of programs that are listed in the television schedule information. The automatic, unattended recording of programs is achieved by controlling a video tape recorder (VCR) or other recording device. Young also proposes utilizing a personal computer for the television schedule information.

Schedule information is typically displayed on a grid or matrix having program names at time and channel locations on the grid. In some systems, such as disclosed in U.S. Pat. No. 5,353,121 (Young), special buttons on a remote control are utilized to schedule events or access information in special formats.

Figure 1:
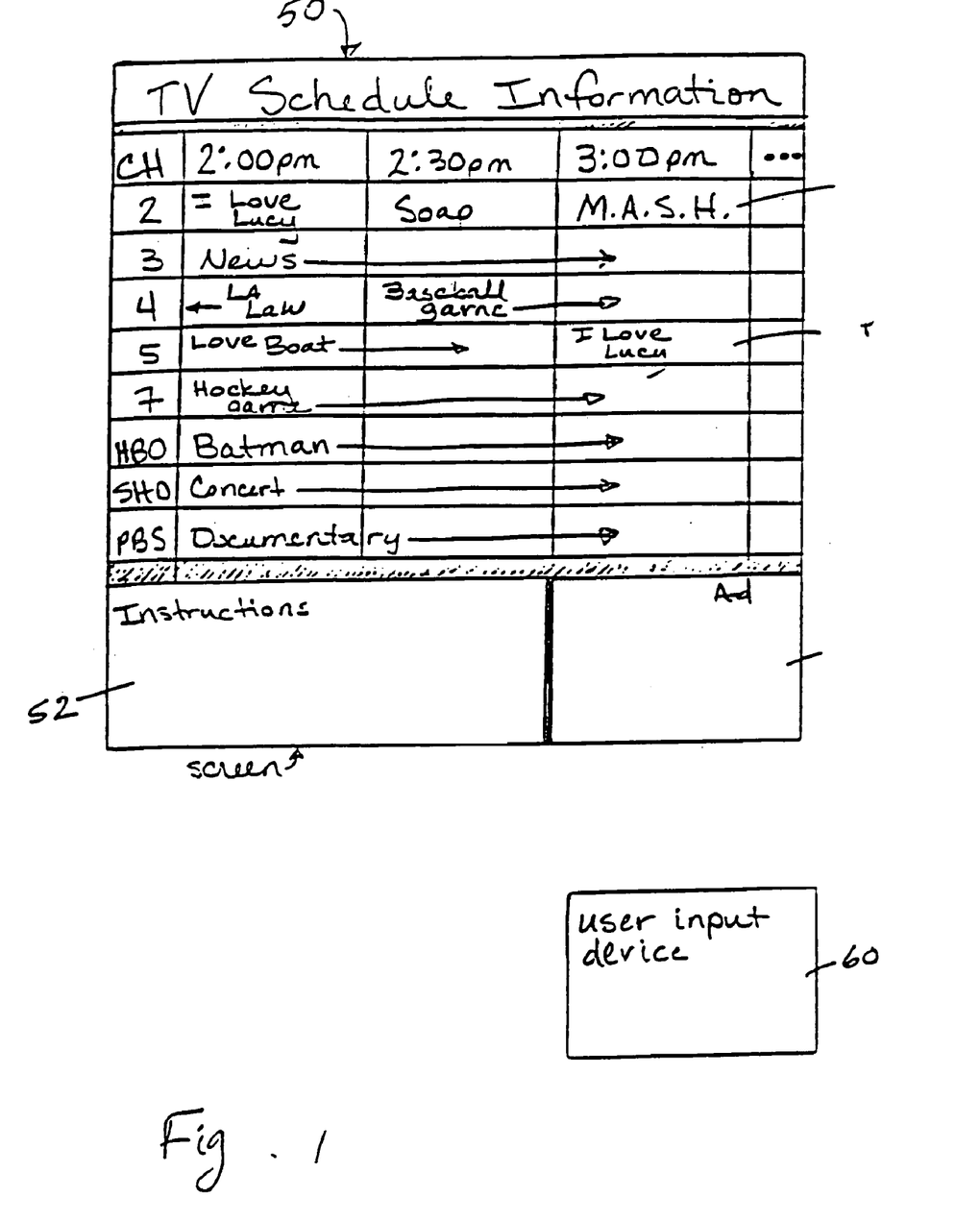
FIG. 1 shows an example of a television schedule grid as displayed on a screen along with a user input device.

FIG. 1 shows an example of a television schedule guide as displayed on a computer screen along with a user input device. In the preferred embodiment, the television schedule information is provided in a grid-like display on a television or computer screen 50. In this example, various channels are provided on the Y-axis of the grid guide, and various times are provided on the X-axis of the grid guide. This display can also contain special instructions for the user in screen area 52. The television schedule guide in FIG. 2 has been customized by a user such that only channels 2, 3, 4, 5, 7, HBO, SHO and PBS are included in the displayed guide. In one embodiment, a television within computer system 810 or television system 830 (FIG. 8) can be used as computer screen 50.

Additionally, when events are scheduled they are added to a schedule of those events. For example, a schedule of all shows to be recorded may be maintained and displayed to the viewer on request when the schedule button is pushed. Additionally, schedules listing all shows of a particular type, e.g., comedy, or broadcast on a particular station may be displayed.

Consumers tend to be uncomfortable with scheduling technology and thus there is a continuing need for creative techniques to make scheduling easier and more accessible to consumers.

SUMMARY OF THE INVENTION

The present invention provides a system for scheduling events that is user friendly and intuitive. According to one aspect of the invention a menu of possible scheduling activities can be popped up for a particular program displayed in a scheduling grid.

According to another aspect of the invention, a menu of possible scheduling activities can be popped-up for a current program being viewed by a viewer.

According to another aspect of the invention, an item is scheduled by selecting it from the popped-up menu.

According to another aspect of the invention, icons reminding the viewer of certain events already scheduled are displayed next to programs in the scheduling grid.

According to another aspect of the invention, icons reminding the viewer of certain events already scheduled are displayed next to events listed in an action pop-up for a particular program.

According to another aspect of the invention, the duration of scheduled events is listed next to the events in a schedule.

According to another aspect of the invention, the on-screen action pop-up is generated by a controller in a set-top box.

According to another aspect of the invention, a memory located within a personal computer stores a computer program and received data. These data include the television schedule information. A processor uses the computer program to organize the television schedule information into a desired format. The television schedule information and action pop-up are then displayed on a television screen or on a computer monitor/display in the desired format.

According to another aspect of the invention, the pop-up menu is activated by holding down a selected button on a remote control for a predetermined period.

According to another aspect of the invention, the pop-up menu can be activated by utilizing an input device to a personal computer.

Additional features and advantages will become apparent in view of the following detailed description and appended drawings.

DESCRIPTION OF SPECIFIC EMBODIMENTS

The present invention provides an interactive computer system which assists a user in utilizing television schedule information. In a preferred embodiment, the user can (1) display television schedule information in a desired format on the computer or television screen, (2) select a chosen program which is listed in the television schedule information to display an action pop-up, and (3) select one or more chosen action items which are listed in the action pop-up to automatically schedule the selected action. To provide this functionality in the preferred embodiment, the present invention includes a computer system, implemented as a dedicated set-top box, a personal computer, or a combination of personal computer and set-top box and a television system. The displays are created and actions scheduled by application software stored in the memory of the computer system.

Figure 2:
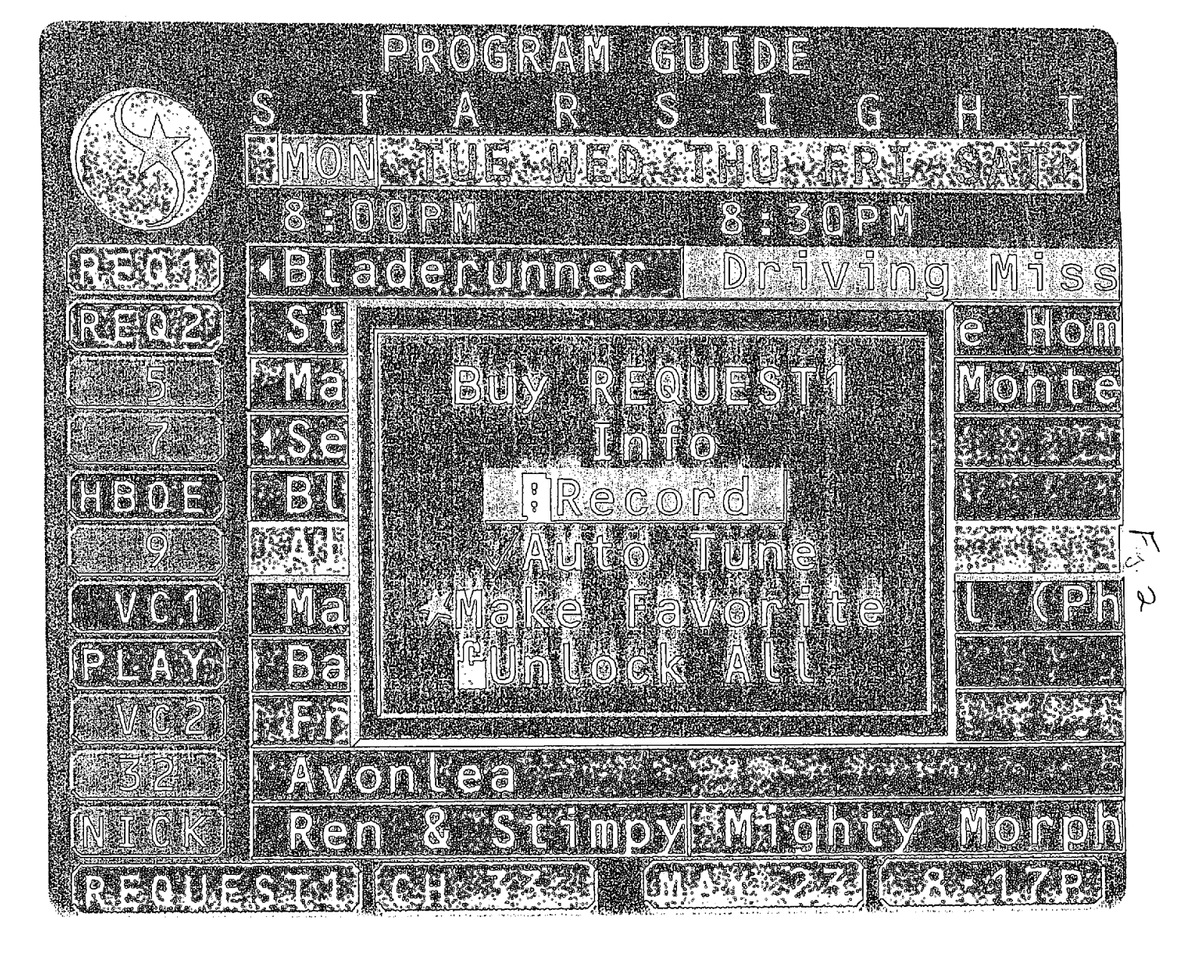
FIG. 2 depicts a pop-up displayed on a screen providing a list of options related to the selected channel and program.
Figure 3:
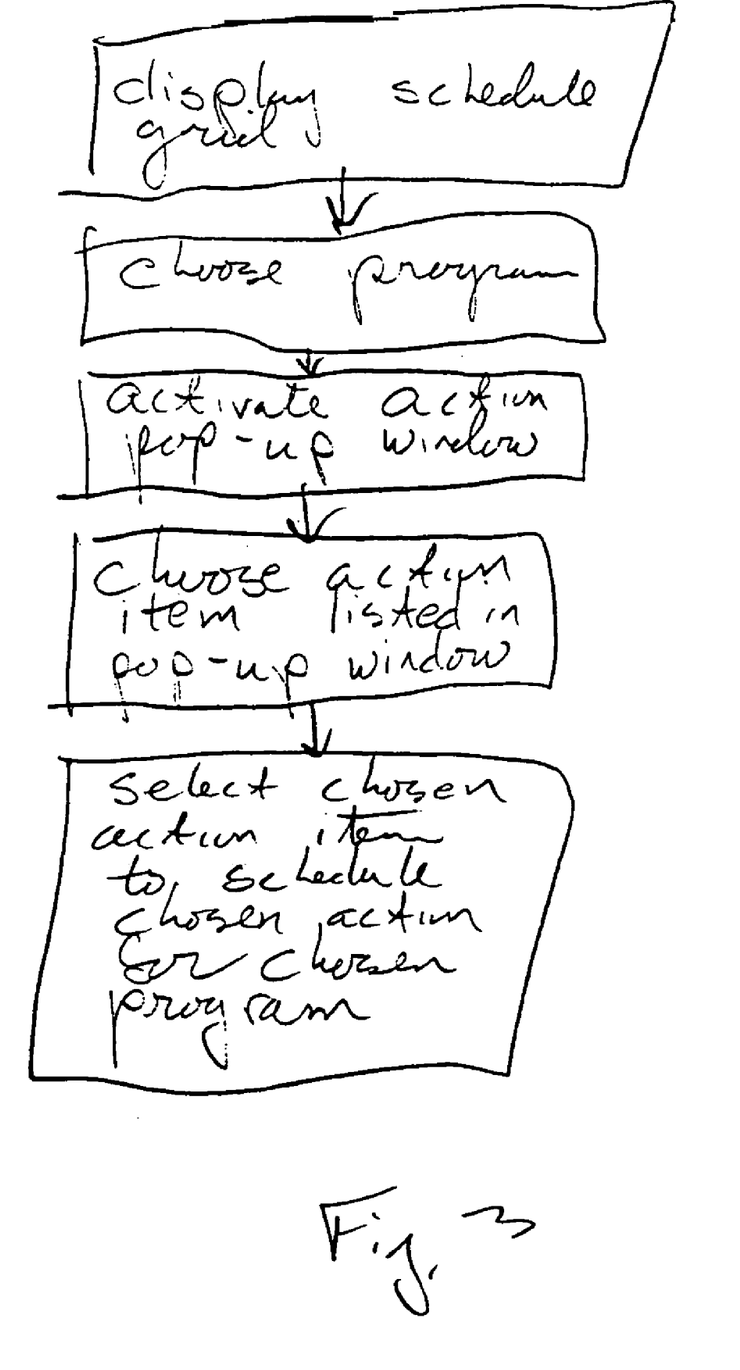
FIG. 3 is a flowchart depicting the steps of scheduling an event with the action pop-up.

FIG. 2 depicts an action pop-up superimposed over a scheduling grid displayed on a television screen. FIG. 3 is a flowchart depicting the steps of initiating the display of the action pop-up and selecting an action to be performed. The utilization of the action pop-up and the function of the application programs stored in computer memory will now be described with reference to FIGS. 1, 2, and FIG. 3, which depict a user input device configured as a remote control.

Figure 4:
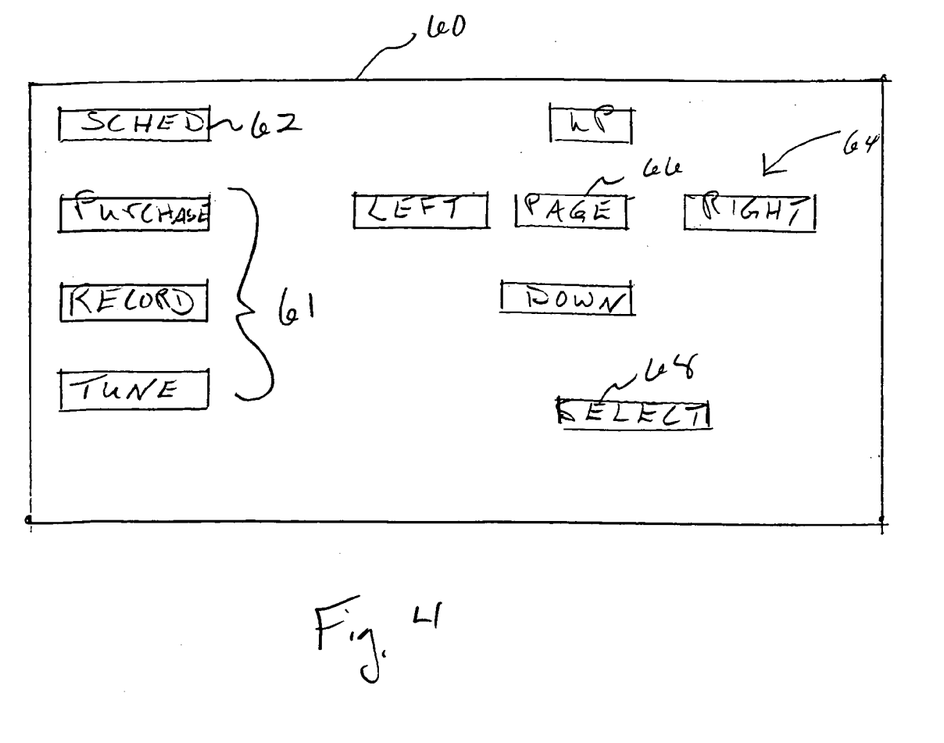
FIG. 4 is a schematic diagram of a user input device.

The user, via input device 60, can scroll throughout the television schedule information provided in the grid guide. FIG. 4 depicts a user input device 60 in the form of a specially configured IR remote control. In FIG. 4, action buttons 61 cause actions to be scheduled, a schedule button 62 causes a schedule of events to be displayed, scroll or cursor 64 buttons allow the user to choose an item in the grid, a page button 66 changes the page of the grid displayed, and a select button 68 selects a chosen program. User input device 60 can also be, for example, a keyboard with arrow keys, a computer pointing device (e.g., a mouse) or a voice recognition input. By utilizing user input device 60, a user can sort, mix, and do a special customized line-up of channels within the television schedule guide displayed on a television or computer screen. In addition, the user can automatically tune to a desired program or can select different programs for automatic recording. For more information on automatic tuning and automatic recording, see U.S. Pat. No. 4,706,121 B1 and U.S. patent Ser. No. 07/623,429, now, U.S. Pat. No. 5,684,525; these patents are, like the present patent application, assigned to Starsight Telecast, Inc. U.S. Pat. No. 4,706,121 B1 and U.S. patent Ser. No. 07/623,429, now, U.S. Pat. No. 5,684,525 are hereby incorporated by reference in their entirety for all purposes.

The viewer chooses a program in the grid by using the cursor direction buttons 64 on the remote control 60. In this embodiment the select button 68 is utilized in hypermode where a short press of the select button causes the application software to initiate a tune function and holding the select button down for a predetermined length of time causes the application software to display the action pop-up.

When the action pop-up is displayed, the viewer moves between the listed actions utilizing the up and down direction buttons 64. When the desired action is chosen, the select button 68 is given a short press to select the desired action to be effected on the chosen program in the grid.

Thus, a viewer does not need to understand the use of the special action buttons or keys 61 on the remote 60 or the keys can be eliminated to simplify the design and reduce the cost of the remote control device.

In FIG. 2 the actions listed are: "Buy"; "Info"; "Auto Tune"; "Record"; "Make Favorite"; and "Unlock All".

Figure 5:
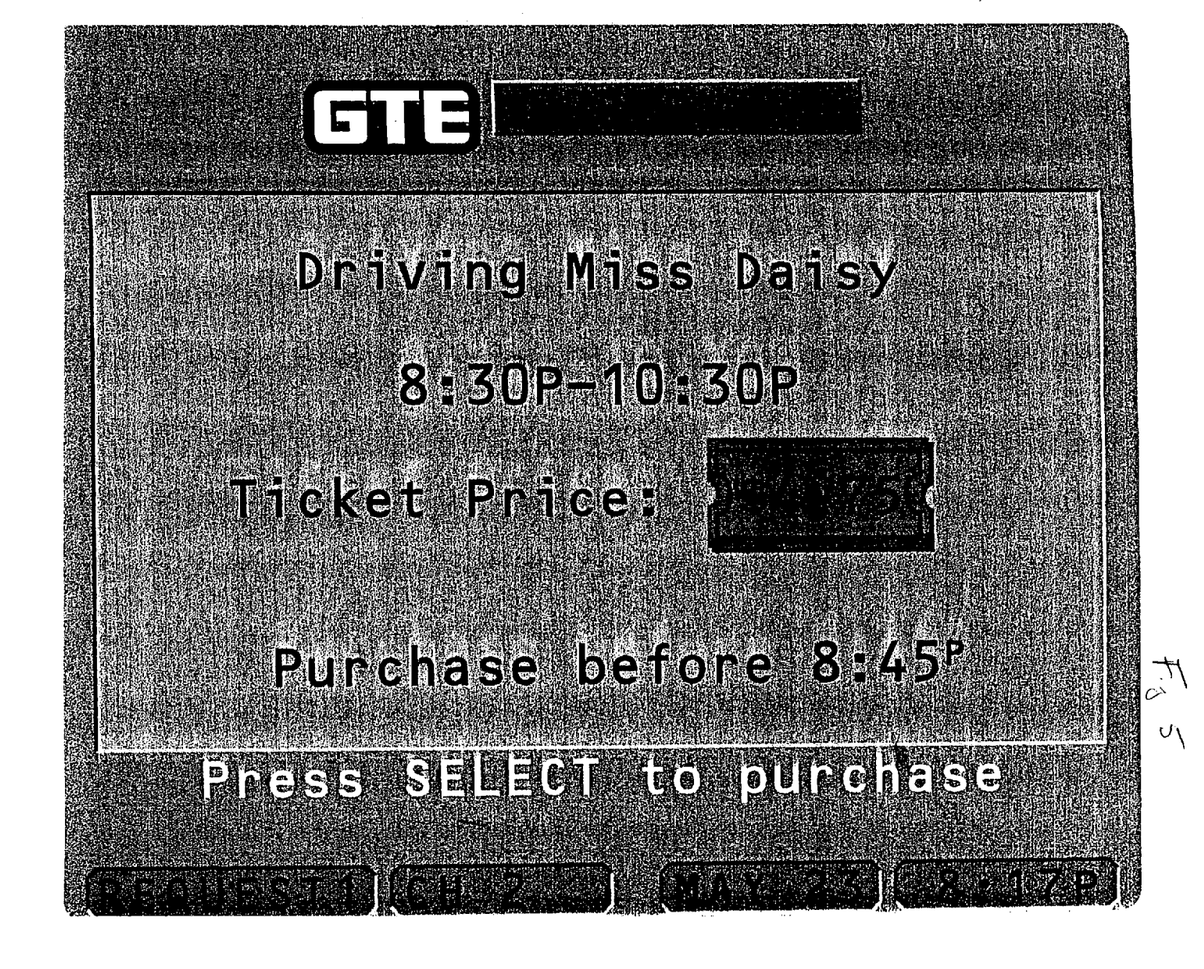
FIG. 5 is a diagram of a display for purchasing a pay-per-view program.

The "Buy" item will only appear if a pay-per-view channel is chosen. If the "Buy" item in the action pop-up is selected then a purchasing screen, as depicted in FIG. 5, is displayed. The purchasing screen displays the time of the program to be purchased and the price of the program. If the user wishes to purchase the program then SELECT is pressed.

If the "Auto Tune" or "Record" items in the action pop-up are selected, these functions are scheduled and implemented as described in the above-referenced patents.

If the "Make Favorite" action is selected, the station broadcasting the chosen program is marked as favorite channel for FAV key tuning.

The "Unlock All" action is displayed only if programming has previously been locked to prevent unauthorized viewing.

Alternatively, the viewer may activate the pop-up to display options available for a program currently being viewed without the need to first display the scheduling grid guide. In the preferred embodiment, the pop-up is activated by holding the select button 68 down for the predetermined length of time. Thus, in FIG. 2 the pop-up would be superimposed over the program currently being watched. The action selected from the pop-up would be directed to program being viewed. For example, it could be made a favorite or recorded by selecting the appropriate options.

Additionally, in the preferred embodiment the application software displays an icon next to the program entry in the scheduling grid to associate the icon with action in the viewer's mind.

Figure 6:
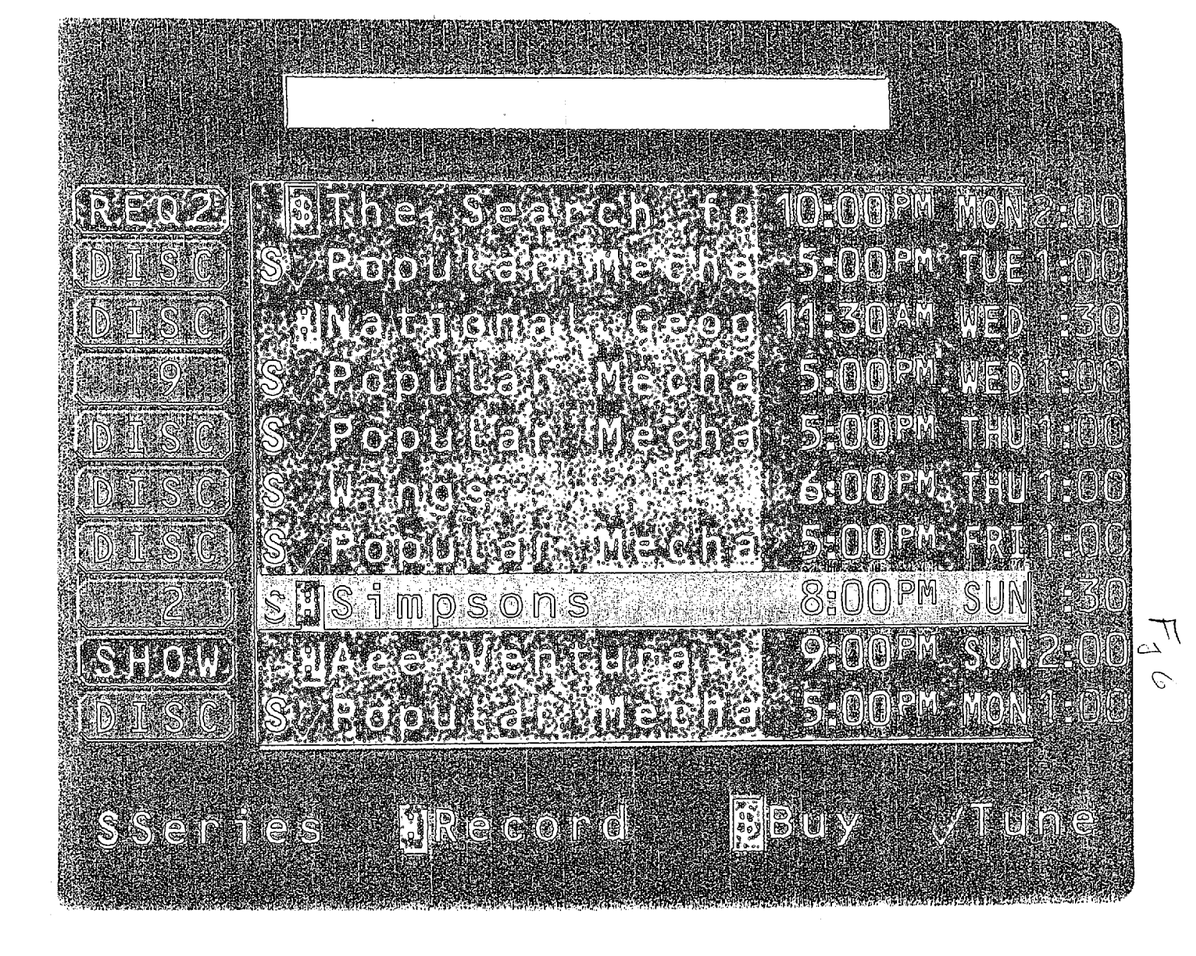
FIG. 6 is a schedule listing actions scheduled.

The icons for the series, record, and tune actions are displayed on the bottom of FIG. 6 which is a schedule of actions scheduled. Briefly, the series icon is displayed along with one of the other icons to indicate that the action indicated by the other icon has been scheduled to occur repeatedly according to a selected schedule. The record icon indicates that the application software will cause the program marked by the icon to be recorded; the buy icon indicates that a pay-per-view program marked by the icon has been purchased; and the tune icon indicates that the application software will automatically tune to the program marked by the icon when the program is broadcast.

In a preferred embodiment, as depicted in FIG. 6, the application software displays the duration of each scheduled event in a column included in a schedule of events display. The information relating to the programs to be recorded is the most important and is highlighted because the viewer must determine whether a cassette has enough available tape to record the program.

Figure 7:
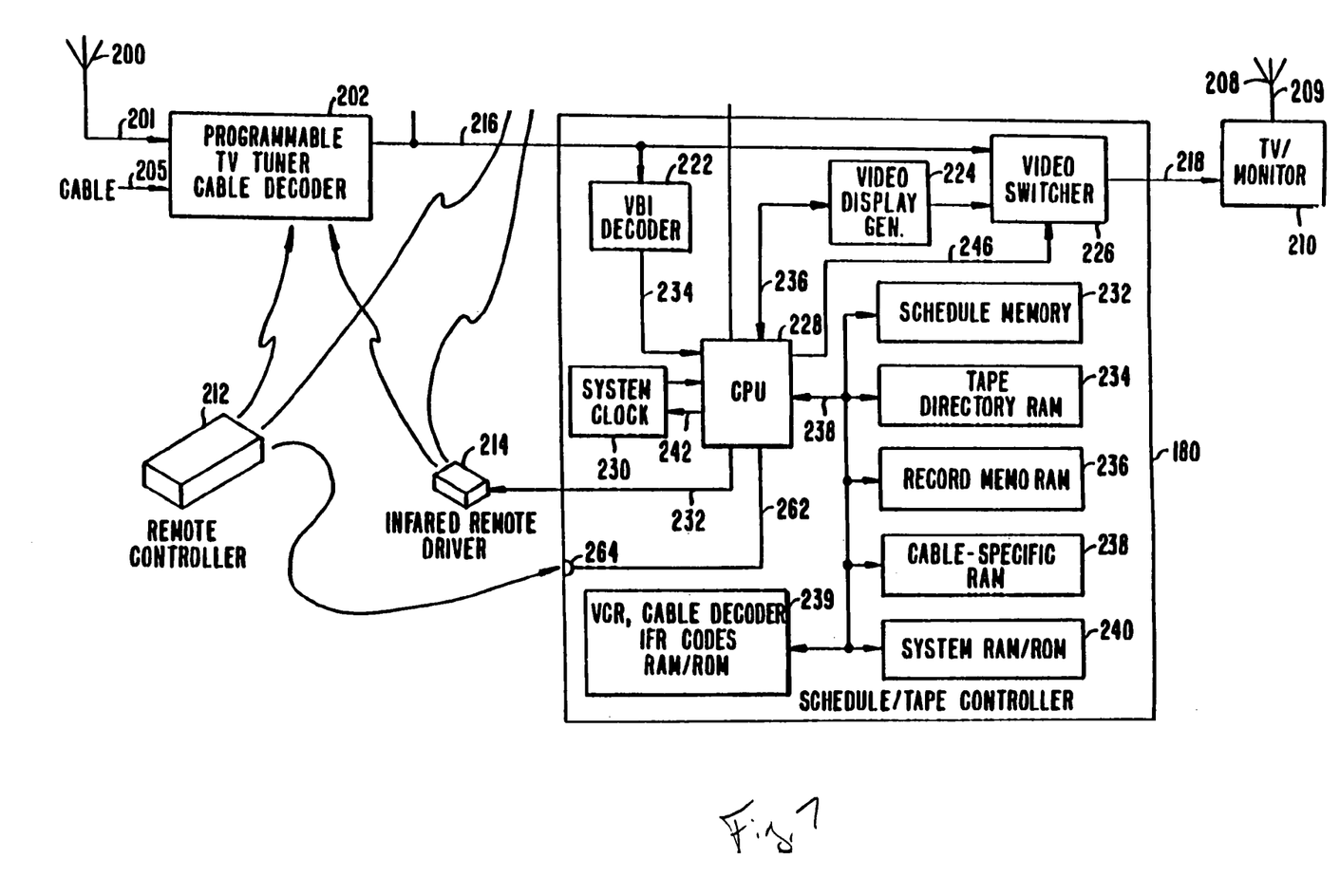
FIG. 7 is a block diagram of a television scheduling system.

FIG. 7 is a block diagram of a television schedule systems/controller 180 with which the viewer input device 212 is used to display action pop-ups. The schedule system/controller 180 is applicable to existing television equipment, where the schedule system is separate from the basic television equipment. Programmable tuner 202 is shown as part of a cable decoder. It is clear from FIG. 7 that the system/controller 180 may be implemented as a set top box or be integrated into other television equipment, such as a cable decoder or a TV/Monitor receiver. It is also practical to implement the entire system/controller 180 in a remote controller by adding a text display, such as an LCD screen, on remote controller 212.

In the system 180, programmable tuner 202, which may be part of a cable decoder unit, receives a TV signal from antenna 200 and/or from cable input 205. Tuner output 216 goes to a vertical blanking interval (VBI) decoder 222, which may be a closed caption decoder or a high speed teletext decoder. Listing information and other support information, such as cable channel assignment data, will be transmitted over the VBI by one or more local stations or cable channels several times a day or continuously.

When update is required, programmable tuner 202 will be tuned automatically to the station or cable channel carrying the data. After the VBI signal is processed by CPU 228, the listing data is stored in schedule memory 232, while the cable channel assignment data is stored in cable-specific RAM memory 238. This data is used to convert generic TV source names, such as HBO, to channel assignments for the specific cable system.

Other information transmitted to the schedule/tape controller 180 and stored in the system RAM memory 240 includes clock update data to set system clock 230 automatically, schedule update time, which may vary from once a day to a continuously transmitted format, new theme categories, and last minute schedule change data.

To display an action pop-up on the television monitor 210 in response to receiving a pop-up input device signal, pop-up image data is stored in system RAM/ROM 240 and is processed by the CPU and output to the video display generator 224. The video switcher 226 is enabled by CPU output 246 to select the video display generator output whenever a pop-up is to be presented to the TV/monitor 210.

Figure 8:
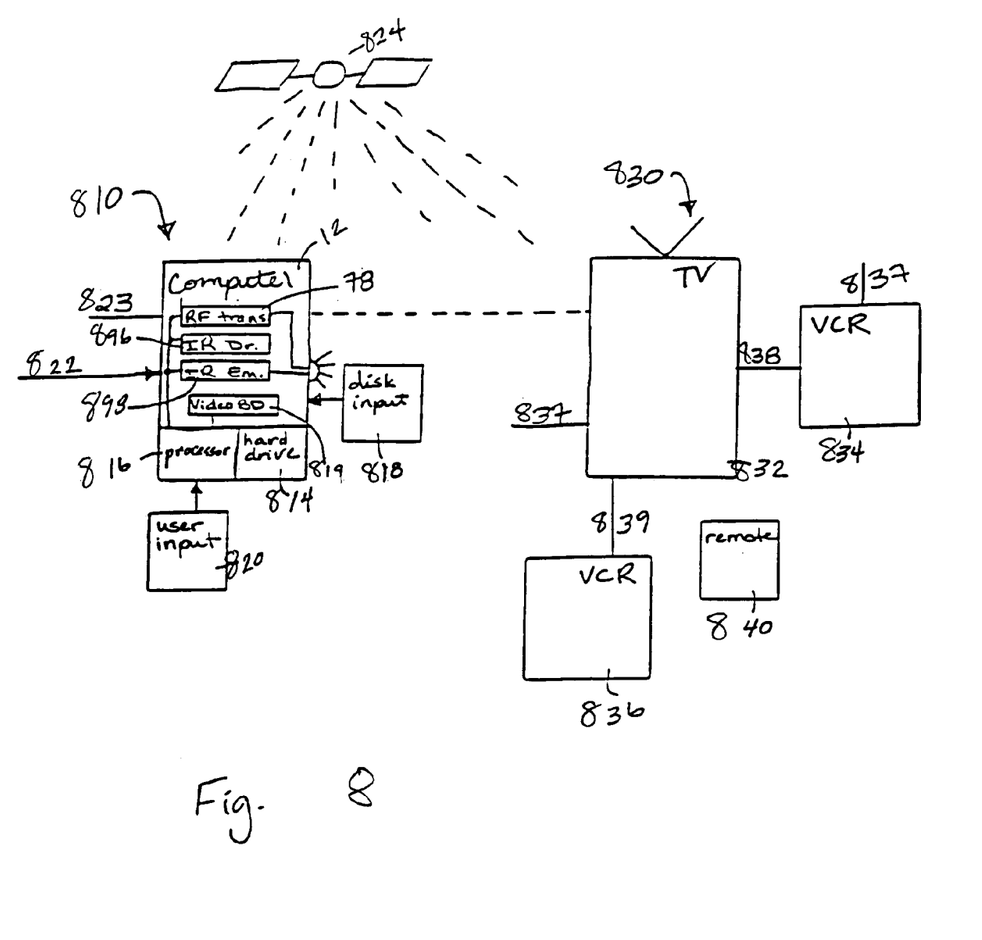
FIG. 8 illustrates a computer system coupled to a television system.

FIG. 8 illustrates a computer system coupled to a television system. In the preferred embodiment, computer system 810 includes standard computer 812 which is, for example, any available personal computer (e.g., IBM compatible, Macintosh, and the like). Computer 812 can also be located within a set-top box (e.g., a DSS box). Computer 812 contains hard drive 814 and processor 816. These units 814 and 816 are usually, automatically included in computer 812. Disk input 818 is used to provide computer 812 with various, additional software. User input 820 allows a user to interact with computer 812 and/or the television schedule guide. Line 823 is connected to an available serial, parallel or other data port 823 on computer 812. This line 823 is used to connect other devices/components to computer 812.

Television system 830 includes television 832 which may be any commercially available television. Television system 830 may or may not include a video tape recorder (VCR). In this embodiment, VCRs 834 and 836 are coupled to television 832. These VCRs 834 and 836 can be, for example, any commercially available VCRs or any other type of recording device (analog or digital). User interface device 840 allows a user to interact with, for example, television 832, VCR 834, and/or VCR 836. As described above, user interface device 60 can be, for example, a remote control or a voice activated interface. Line 837 is used to connect other devices to VCR 834 and television 832. Other devices can also be connected in series between VCR 834 and television 832 via line 838. Computer 812 (or computer system 810) and television 832 (or television system 830) can be located in different rooms within a private residence or a commercial building.

In the preferred embodiment, a computer program that is hard-coded is provided on diskettes, a CD ROM or other medium contains the software needed for receiving, organizing and displaying data for the television schedule guide. These diskettes are inserted in disk input 818 and the software for these diskettes is stored within computer 812 on hard drive 814 or on another mass storage location. This action can be performed by, for example, the user or a service person. The computer program can also be provided, for example, via downloading from a satellite 824, transmission through the internet or other on-line service, or transmission through another type of land line 822 (e.g., coax cable, telephone line, optical fiber, or the like).

The present invention will be of great utility in PCTV applications, where a PC monitor including a tuner to function both as a television screen to view programming and a computer monitor to display computer generated displays. For example, the "Buy" action item, when selected, can be executed by the PC automatically communicating service provider and purchasing the selected program.

In addition to the computer program, data for the basic schedule information and other related data (e.g., data relating to a particular show) are needed for the generation and maintenance of the television schedule guide. These data can be received via line 822; they can also be provided via a satellite broadcast from satellite 824. Additionally, the television schedule information and related data can be sent directly to television 832 via satellite 824. In this arrangement, the television schedule information and related data does not have to be transmitted from computer system 810 to television system 830.

In one embodiment, line 822 is a telephone line which provides access to the internet or other on-line service via, for example, a regular modem or direct modem access to a schedule provider. The schedule data are then provided via the internet or other on-line service, or directly from the service provider. As stated above, line 822 can also be, for example, coax cable, optical fiber or any other land line which can provide data to computer 812. The software program saved on hard drive 814 then utilizes the data received on line 822 to generate a television schedule guide. The user can retrieve this generated television schedule guide when desired.

In general, the flowcharts in this specification include one or more steps performed by software routines executing in a computer system. The routines may be implemented by any means as is known in the art. For example, any number of computer programming languages, such as Java, "C", Pascal, FORTRAN, assembly language, etc., may be used. Further, various programming approaches such as procedural, object-oriented or artificial intelligence techniques may be employed.

Many such changes or modifications will be readily apparent to one of ordinary skill in the art. For example, a pop-up could be displayed in any schedule of programs to schedule events for programs displayed. Further, in a PCTV context, actions displayed in a PCTV pop-up could include buying an item being sold on a home shopping station.

While a full and complete disclosure of the invention has been provided, it will be apparent to those skilled in the art that various modifications and changes can be made.

What is claimed is:

1. A processor-implemented method for performing and scheduling actions related to viewing and recording television programs, the method being implemented in a system including a television, a processing system, a television/processing system interface, a viewer input device and an input device/processing system interface, the method comprising the steps of:

displaying a program schedule listing having a plurality of program names and indicating the time and channel that a named program is to be broadcast;

indicating that a particular program has been selected in response to a move cursor command generated by the viewer input device;

displaying an action pop-up menu in response to a first command generated by the viewer input device, the action pop-up menu being overlaid over the program schedule listing and including a listing of different types of scheduling actions relating to the particular program chosen, the listing including one or more actions unrelated to recording a television program, at least one of the scheduling actions being selectable;

indicating that one of the scheduling actions has been selected in response to a move cursor command, which navigates a highlight region to a particular scheduling action, generated by the viewer input device; and scheduling the action chosen in response to a selection command generated by the viewer input device.

2. A method as recited in claim 1, and further comprising the step of displaying an icon next to each displayed scheduling action to associate the icon with the action.

3. A method as recited in claim 2 wherein the displayed icon is a symbol indicating that the scheduled action is to record the chosen particular program.

4. A method as recited in claim 2 wherein the displayed icon is a symbol indicating that the scheduled action is to purchase the chosen particular program.

5. The method as recited in claim 2 wherein the displayed icon is a symbol indicating that the scheduled action is to automatically tune to the selected particular program when it is received.

6. A method as recited in claim 1, and further comprising the steps of:
 displaying a schedule of selected actions as a listing of scheduled actions;
 displaying the duration of each scheduled action in the displayed schedule; and
 displaying an icon next to each of the scheduled actions to indicate the type of action scheduled.

7. A method as recited in claim 6 wherein the displayed icon is a symbol indicating that the scheduled action is to record the chosen particular program.

8. A method as recited in claim 6 wherein the displayed icon is a symbol indicating that the scheduled action is to purchase the chosen particular program.

9. The method as recited in claim 6 wherein the displayed icon is a symbol indicating that the scheduled action is to automatically tune to the selected particular program when it is received.

10. A processor-implemented method for performing and scheduling actions related to viewing and recording television programs, with the method implemented in a system including a television, a processing system, a television/processing system interface, a viewer input device and an input device/processing system interface, the method comprising the steps of:
 displaying a current program for viewing by a user;
 displaying an action pop-up menu in response to a first signal generated by the viewer input device, the pop-up menu including a plurality of different actions, each relating to the current program being viewed, at least one of the actions being selectable in response to a selection signal generated by the viewer input device, one or more of the actions being unrelated to recording a television program;
 indicating that one of the plurality of actions has been chosen in response to a move cursor signal, which navigates a highlight region to a particular action, generated by the viewer input device; and
 scheduling the action chosen for the current program in response to the selection signal generated by the viewer input device,
 wherein both the first signal and the selection signal are generated through actuation of a single key on the viewer input device.

11. A method as recited in claim 10, and further comprising the step of displaying an icon next to each action scheduled to associate the icon with the action.

12. A method as recited in claim 11 wherein the icon is a symbol indicating that the action scheduled is to record the chosen particular program.

13. A method as recited in claim 11 wherein the icon is a symbol indicating that the action scheduled is to purchase the chosen particular program.

14. A method as recited in claim 11 wherein the icon is a symbol indicating that the action scheduled is to automatically tune to the chosen particular program when it is received.

15. A method as recited in claim 10, and further comprising the steps of:
 displaying a schedule of selected program events listing each scheduled event;
 displaying the duration of each event in the displayed schedule; and
 displaying an icon next to each event indicating the type of action scheduled.

16. A method as recited in claim 15 wherein the icon is a symbol indicating that the action scheduled is to record the chosen particular program.

17. A method as recited in claim 15 wherein the icon is a symbol indicating that the action scheduled is to purchase the chosen particular program.

18. A method as recited in claim 15 wherein the icon is a symbol indicating that the action scheduled is to automatically tune to the chosen particular program when it is received.

19. A device including a computer readable medium having a stored computer readable code embodied thereon for scheduling actions related to viewing and a recording television programs in a system including a television, a processing system, a television/processing system interface, a viewer input device and an input device/processing system interface, the scheduling device comprising:
 a computer readable program code device configured to cause a computer to display a program schedule listing showing a plurality of program names and indicating the time and channel that a named program will be received;
 a computer readable program code device configured to cause a computer to indicate that a particular program has been chosen in response to a move cursor command generated by a viewer input device;
 a computer readable program code device configured to cause a computer to display an action pop-up menu having a plurality of selectable scheduling actions relating the particular program chosen, in response to a first command generated by the viewer input device, one or more of the actions being unrelated to recording the television program;
 a computer readable program code device configured to cause a computer to indicate that one of the scheduling actions has been chosen in response to a mover cursor command generated by the viewer input device;
 a computer readable program code device configured to cause a computer to schedule the action chosen in response to a selection command, which navigates a highlight region to a particular scheduling action, generated by the viewer input device; and
 a computer readable program code device configured to cause a computer to display an icon adjacent to the scheduled action indicating that the action has been scheduled whenever an action pop-up menu is displayed for the particular program chosen.

20. A scheduling device as recited in claim 19 wherein the computer readable program code device configured to cause a computer to display an action pop-up menu further causes the computer to overlay the action pop-up menu over the displayed program schedule listing.

21. A scheduling device including a computer readable medium having stored a computer readable code embodied thereon for causing scheduling actions related to viewing and recording televisions programs to be performed in a system including a television, a processing system, a television/processing system interface, a viewer input device and an input device/processing system interface, with the television displaying a current program being viewed by a viewer, the scheduling device comprising:
- a computer readable program code device configured to cause a computer to display an action pop-up menu having a plurality of selectable scheduling actions relating the current program being viewed, in response to a first signal generated by the viewer input device, one or more of the actions being unrelated to recording the television program;
- a computer readable program code device configured to cause a computer to indicate that one of the selectable actions has been chosen in response to a mover cursor signal generated by the viewer input device; and
- a computer readable program code device configured to cause a computer to schedule the action chosen for the current program being viewed in response to a selection signal, which navigates a highlight region to a particular action, generated by the viewer input device; and
- a computer readable program code device configured to cause a computer to display an icon next to the scheduled action indicating that the action has been scheduled whenever an action pop-up menu is displayed for the particular program chosen.

22. A scheduling device as recited in claim 21 wherein the first signal and the selection signal are the same signal.

23. A television schedule system providing actionable television schedule information comprising:
- a viewer input device for generating a plurality input commands, the viewer input device including a plurality of keys for generating a move cursor input command and a hypermode key capable of generating an action pop-up input command and a selection input command;
- an input device processor for receiving the input commands;
- a memory for storing a computer program and information related to generating a scheduling grid for displaying television program information, including the time and channel of each displayed program broadcast;
- a display device including a display processor interface;
- a processor in electronic communication with the input device processor interface, the memory and the display, the processor being configured to:
- generate a program scheduling grid on the display, the generated scheduling grid showing program names at grid locations and indicating the time and channel that a named program will be received;
- indicate on the scheduling grid that a particular program has been chosen in response to a move cursor input command generated by the viewer input device;
- display an action pop-up menu in response to an action pop-up input command generated by the viewer input device, the action pop-up menu being overlaid over the displayed scheduling grid and including a plurality of selectable scheduling actions relating the particular program chosen, each of the scheduling actions being directly actionable in response to a selection input command, one or more of the actions being unrelated to recording the television program;
- indicate that one of the plurality of selectable actions has been chosen in response to a move cursor input command, which navigates a highlight region to a particular action, generated by the viewer input device; and
- schedule the action chosen in response to a selection input command generated by the viewer input device.

24. A television schedule system as recited in claim 23 wherein the hypermode key on the viewer input device is further capable of selectively generating a tuning function input command when the hypermode key is briefly pressed and generating the action pop-up input command when the hypermode key is actuated for a predetermined time interval.

25. A television control system comprising:
- a viewer input device for generating a plurality input device signals, the viewer input device including a plurality of move cursor keys for generating a move cursor input command and a select key capable of generating both an action pop-up input command and a selection input command;
- an input device processor interface for receiving said input commands;
- a memory for storing a computer program;
- a display for displaying a television program being currently viewed by a viewer;
- a display processor interface;
- a processor electrically coupled to the memory, the input device and display processor interfaces and the display, the processor for executing the computer program to schedule events, the processor being configured to:
- display an action pop-up menu in response to an action pop-up input command generated by the viewer input device, the action pop-up menu having a plurality of selectable scheduling actions relating the program being currently viewed, each of the selectable scheduling actions being directly actionable in response to a selection input command, one or more of the actions being unrelated to recording the television program;
- indicate that one of the plurality of selectable actions has been selected for the current program in response to a move cursor input command, which navigates a highlight region to a particular action, generated by the viewer input device; and
- execute the action chosen for the current program in response to a selection input command generated by the viewer input device both the selection input command and the pop-up input command being generated in response to actuation of the select key.

26. A television schedule system as recited in claim 25 wherein the select key further generates a first input command when briefly actuated and generates a second input command when actuated for a predetermined time interval, the second input command being one of the select input command and the action pop-up input command.

27. A television schedule system as recited in claim 25 wherein the viewer input device additionally includes a favorite channel key, the action pop-up menu additionally displays a favorite channel action, and the processor is additionally configured to mark as a favorite channel the channel of the current program when the favorite channel is chosen and to display a marked favorite channel in response to actuation of the favorite channel key.

28. A television schedule system as recited in claim 25 wherein programming has been locked to prevent unauthorized viewing, the action pop-up menu additionally displays an unlock action, and the processor is additionally configured to unlock the locked programming when the unlock action is chosen.

* * * * *

UNITED STATES PATENT AND TRADEMARK OFFICE
CERTIFICATE OF CORRECTION

PATENT NO.        : 7,212,249 B1                                              Page 1 of 1
APPLICATION NO.   : 10/831594
DATED             : May 1, 2007
INVENTOR(S)       : Marcia A. Casement and David Folker It is certified that error appears in the above-identified patent and that said Letters Patent is hereby corrected as shown below:

Column 5, line 59, change "including" to -- include --.
Column 9, line 1, change "televisions programs" to -- television programs --.
Column 9, line 32, change "plurality input" to -- plurality of input --.

Signed and Sealed this

Eighteenth Day of September, 2007

JON W. DUDAS
*Director of the United States Patent and Trademark Office*